Jan. 14, 1936.  I. DIEBEL  2,027,520
SHUTTER MECHANISM FOR MOTION PICTURE PROJECTORS
Original Filed Feb. 23, 1931  2 Sheets-Sheet 2
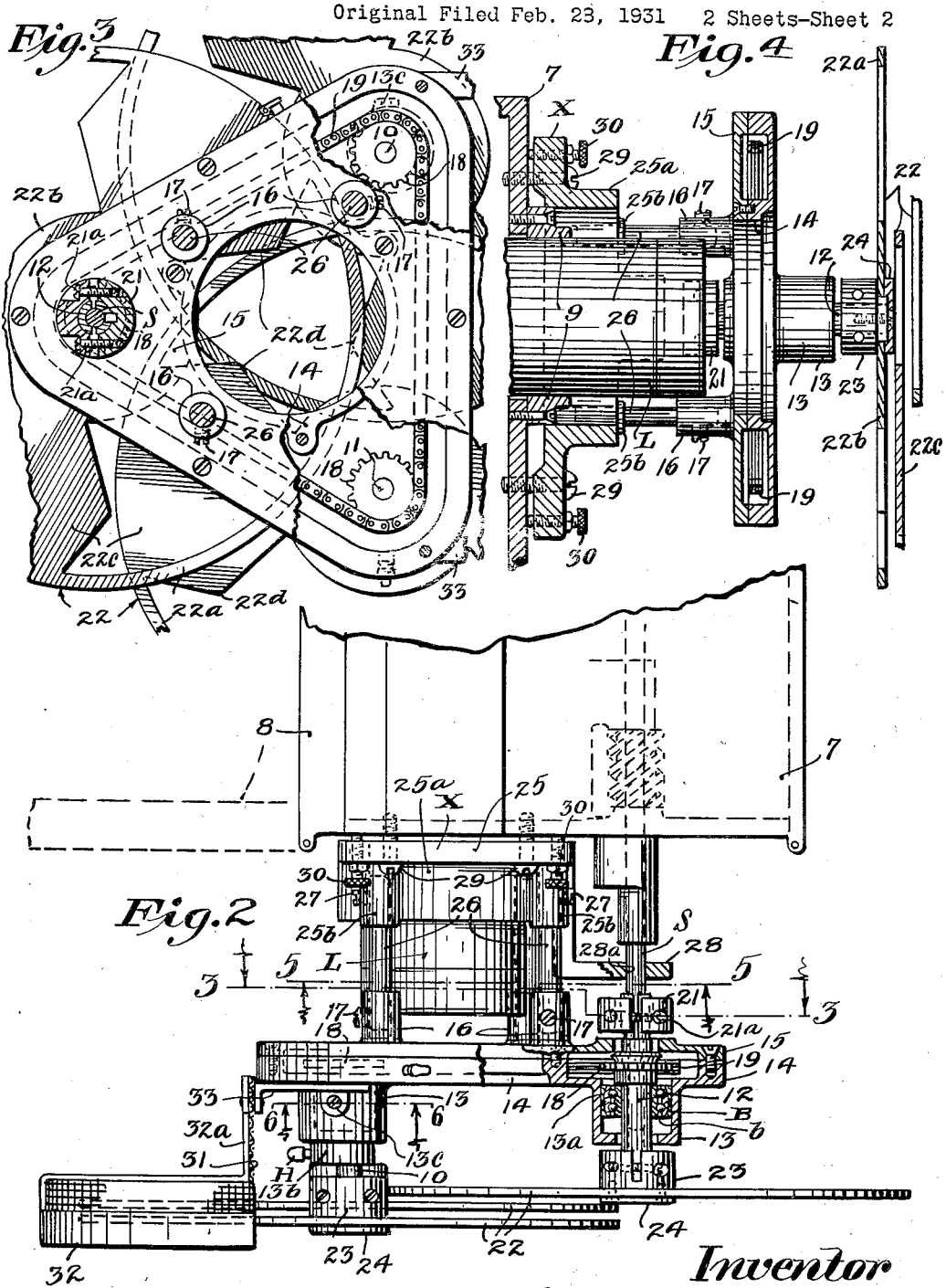
Inventor
Israel Diebel
By his Attorneys
Williamson & Williamson Jan. 14, 1936.                I. DIEBEL                2,027,520
              SHUTTER MECHANISM FOR MOTION PICTURE PROJECTORS
                  Original Filed Feb. 23, 1931    2 Sheets-Sheet 2
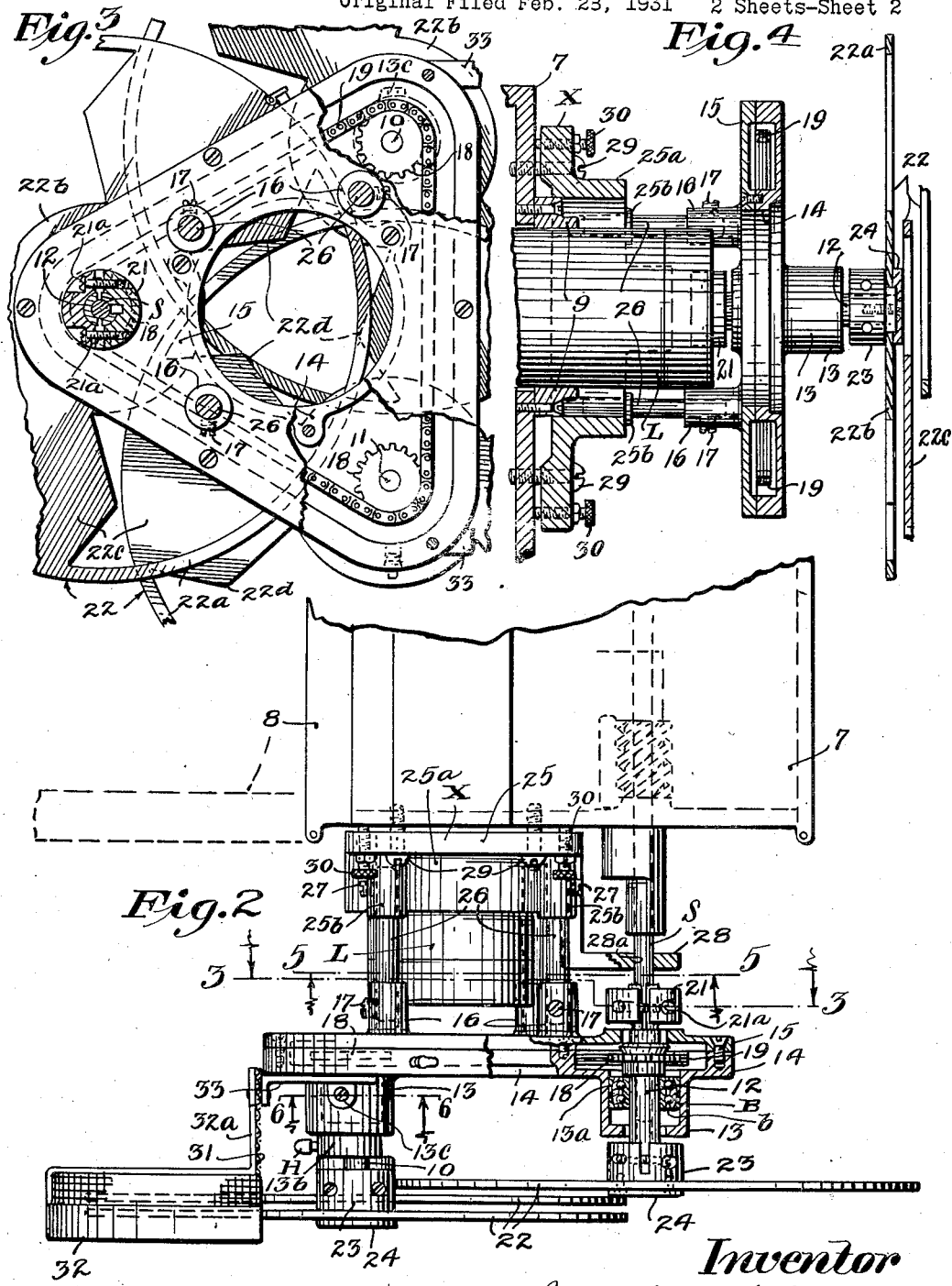
Inventor
Israel Diebel
By his Attorneys
Williamson & Williamson Patented Jan. 14, 1936

2,027,520

UNITED STATES PATENT OFFICE 2,027,520

SHUTTER MECHANISM FOR MOTION PICTURE PROJECTORS

Israel Diebel, Minneapolis, Minn.

Substitute for abandoned application Serial No. 519,048, February 28, 1931. This application December 20, 1934, Serial No. 758,457

8 Claims. (Cl. 88—19.3)

This invention relates to shutter mechanism for motion picture projectors and is an improvement upon the invention disclosed in Letters Patent No. 1,749,154 granted to A. M. O'Hagen and George C. Berger on March 4th, 1930.

In said identified patent a shutter mechanism was disclosed which eliminated to a considerable extent both flicker and "travel ghost" upon the screen. By "travel ghost" is meant the foggy appearance or effect produced upon the picture by the movement of the blade of the shutter across the film at the time the film is in motion. Said shutter mechanism comprised a series of, preferably 3, shutters arranged equi-distantly and with their centers disposed circumferentially about the lens of the apparatus and means for rotating the shutters synchronously so that the blades of the three shutters would simultaneously cooperate to pass across the lens, cutting off and admitting the light faster than shutters previously utilized.

The mechanism disclosed in said patent, while reasonably satisfactory for so-called "silent pictures" was found to be objectionable in certain respects when utilized in connection with sound-accompanied pictures. It was found that in the original structure the several shutters could not be driven absolutely uniformly due to the driving connections and mounting of the mechanism upon the motion picture projector and in sound pictures the slight irregularity of the rotation of the moving parts produced objectionable noises from the loud speakers and caused an imperfect synchronization of the images with the talking or sounds.

Moreover, in the original structure it was exceedingly difficult to properly align a mounting bracket with respect to the lens and the power take off or driving shaft, resulting in some distortion of the picture and augmenting the irregularity of the revolutions of the several elements.

It is an object of my present invention to provide an improved and highly efficient shutter mechanism of the type described which will entirely overcome the objections previously mentioned, producing an almost perfect uniformity in the driving of the several shutter elements and in the synchronization of the operation of the shutters with the production of the sounds.

More specifically it is an object to provide an improved commercial shutter mechanism equipped with self-aligning means on the attachment bracket to enable the shutters to be properly positioned with respect to the lens and to enable the connection on the driven member of the shutter to be perfectly aligned with the driving shaft provided by the motion picture projector.

It is a further object to provide in such a device cooperating shutter elements of an improved form which will have greater rigidity and strength and cooperate more closely than the elements of the said original device.

Another object is to provide in shutter mechanism of the class described an efficient guard associated with the revolving shutter elements to protect the operator and prevent accidents.

These and other objects and advantages of the invention will be more fully set forth in the following description, made in connection with the accompanying drawings, in which like reference characters refer to similar parts throughout the several views, and, in which, Fig. 1 is a front elevation showing an embodiment of my invention applied to a conventional motion picture projector;

Fig. 2 is a top plan view of the same, some parts being broken away and others shown in section;

Fig. 3 is a cross section taken on the line 3—3 of Fig. 2;

Fig. 4 is a vertical section taken on the line 4—4 of Fig. 1;

Fig. 5 is a cross section taken on the line 5—5 of Fig. 2 showing the self-aligning and adjustable mounting bracket for the shutter mechanism and Fig. 6 is a fragmentary section taken on the line 6—6 of Fig. 2, and showing the means for adjusting the tension of the driving chain.

This application is a substitute of abandoned application Serial Number 519,048, filed Feb. 28th, 1931.

In the drawings an embodiment of my invention is illustrated as attached to the case or box 7 of a conventional type of motion picture projector. This case has the usual hinged door 8 disposed at one of the sides and adjacent the forward end thereof and has secured in its front wall the conventional annular collar 9 which surrounds and positions the usual lens L of the projector proper, the lens usually extending some distance beyond said wall. In commercial motion picture projectors in the market at this time the lens collar 9 is provided with an attachment flange secured to the front wall of the projector case and the outer periphery of said flange is always circular and of a standard diameter regardless of the diameter of the opening for accommodating the lens. The projector is provided with the usual power take off or shutter driving shaft S projecting from the forward end of the case 7 and extending substantially parallel to the axis of the lens. This shaft in standard projectors is located in practically all instances a predetermined distance from the center of the lens collar.

Disposed circumferentially about the lens and spaced equal distances apart are a series of shutter shafts 10, 11 and 12 journaled in roller bearings which are housed in a series of horizontally projecting hollow bosses 13 rigidly secured to or integrally formed with the outer section 14 of a two-part triangular gear and chain case, provided with a large central aperture of greater diameter than the largest size lens conventionally utilized. The inner section 15 of said gear case is channeled as is the outer section 14 and carries on the back thereof a series of, as shown three, horizontal socket sleeves 16 provided with diametrical set screws 17 to facilitate adjustable attachment to horizontal supporting shafts later to be described.

Each of the shutter shafts 10, 11 and 12 carries a sprocket 18. An endless silent chain 19 is trained about the three sprockets and disposed within the triangular channel provided by the sections 14 and 15 of the gear and chain case. Shutter shaft 12 is driven from the power take-off shaft S of the projector and is precisely aligned with the outer and projecting end of said shaft being coupled thereto to suitable means, such as a two-part clamping collar 21, clearly illustrated in Figs. 2 and 3, the sections of said clamping collar being drawn together by bolts 21a.

The shutter shaft 12 is preferably journaled in a special bearing B which consists in inner and outer ball races, the outer race "b" of which is of arcuate cross section fitted into a sleeve 13 which has an inner periphery of complementary shape to permit slight rocking movement of the races and shaft 12 relative to supporting boss 13. One of the shutter shafts, as shown, shaft 10, is mounted eccentrically in a disk 13b, see Fig. 6, and this disk may be secured in the desired oscillated position relative to its supporting boss 13 by suitable means such as a set screw 13c. It will be apparent that by oscillating disk 13b through the handle H shown in Fig. 2, the position of shaft 10 relative to the axial center of the boss 13 may be varied to tighten the driving chain 19 within, of course, certain limits.

Each of the shutter shafts at its outer end carries a shutter 22. The three shutters are so disposed that they will over-lap, being arranged at slightly different distances from the projecting machine to clear each other when in operation. Care is taken to arrange the several shutters close enough together to avoid a blurring effect by reason of the passage of light around the shutter edges. Each shutter consists of a hub member including a clamping collar 23 fixed to the end of the shaft and a disk 24 disposed in the front surface of the shutter proper and cooperating with the forward end of the clamping collar to securely hold the shutter in proper operative position.

The shutters 22 are preferably each constructed from a thin integral disk having relatively large oppositely disposed apertures extending inwardly from arcuate lines 22a which are disposed concentric with the disk periphery. The disks are cut to leave a central substantially circular hub attachment portion 22b and a pair of opposite diametrically disposed shutter blades 22c extending from said hub attachment portion to the periphery of the disk. Each blade has its side edges diverging outwardly from the hub attachment portion to points 22d located about midway in the length of the blade and then converging toward the periphery of the disk. The blades are of such length that they will completely cover the lens and the points 22d of each shutter are so positioned that they pass across the lens at the axis thereof. It will be noticed that the rims of the several shutters including the arcuate lines 22a surround the lens L.

In Fig. 1 the three shutters are shown in the synchronized position assumed when the blades are entering the field of the lens and it will be noted that the three cooperating blades will simultaneously pass across the lens, and the angles or points 22b of the blades will follow arcs passing through the axial center of the lens.

It is very essential that the shutter shafts 10, 11 and 12 be disposed in a circle extending concentrically of the lens L and further that the driven shutter shaft 12 be in proper axial alignment with the power take off or shutter driving shaft S. To this end I have provided a self-aligning supporting bracket indicated as an entirety by the letter X and comprising an attachment plate 25 having a flat rear surface and provided with an arcuate flange 25a which has a smooth inner periphery extending in a major arc and of proper diameter to snugly fit and surround the outer periphery of the annular lens collar 9. Flange 25a rigidly carries three triangularly arranged shaft receiving sockets 25b which may be integrally formed therewith, which extend perpendicular to attachment plate 25 and are arranged for precise axial alignment with the supporting sockets 16 of the inner section 15 of the gear and chain case. Three supporting shafts 26 are secured in sockets 25b by suitable means such as the set screws 27 and the outer ends of said shafts are secured in the sockets 16 of the inner gear and chain case section 15. It will be readily apparent that some slight adjustment may be made in the spaced relation of the gear and chain case and supporting bracket due to the slidability of the sockets and supporting shafts. However, where greater adjustability is desired this can be easily provided for by providing longer or shorter supporting shafts. Supporting bracket X is also provided with an outwardly extending or radial arm 28 which may be integrally formed with plate 25 and said arm has a bearing eye or aperture 28a therethrough extending perpendicular to the plane of the attachment plate and positioned precisely to receive axially the power take off or shutter driving shaft S when the attachment plate has been oscillated to proper position relative to the lens collar 9. After properly aligning the supporting bracket the same may be attached to the front wall of the projector case by suitable means, such as the screws 29 which work through apertures provided in the attachment plate 25. Three adjustment screws 30 extend perpendicular to the attachment plate 25 and threadedly engage said plate at the corners thereof and the inner ends of said screws are adapted to be thrust against the front wall of the projector case to provide a micrometer adjustment for regulating angulation of the plane of the attachment bracket with respect to the front wall of the case. This slight adjustment is desirable in order that a perfect axial alignment of the power take off shaft, bearing eye 28a and the shutter shaft 12 be effected.

With the construction of my synchronized multiple shutter mechanism in its relation to projectors of conventional form, it will be seen that the edges of two or more of the revolving shutter disks will project some distance beyond the sides of the projector case. I provide an efficient guard at the side of the machine adjacent the door 8 to protect the operator's hands and fingers when the door is opened. My guard as shown comprises a sheet 31 of metal netting secured to a substantially arcuate frame 32, said frame being spaced from the projecting edges of the two shutters at the door side of the machine and the netting being disposed rearwardly of said shutters. The frame 32 may be supported from the forward section 14 of the gear case by an angle bracket 33, the outer arm of which may be clamped to an angle arm 32a of the frame.

In operatively mounting my improved device upon a motion picture projector, the self aligning supporting bracket X is first engaged with the outer periphery of the flange of the lens collar 9 and properly oscillated to bring the bearing aperture 28a in proper alignment with the shutter driving shaft S of the machine. The driving shaft may be inserted through the eye-bearing, precisely positioning the bracket for attachment to the front wall of the projector case. The attachment screws 29 may then be applied and the gear case secured to the supporting shafts 26. Said shafts are formed of proper length to position the shutter disks properly with respect to the lens, usually at the point of coincidence of the lens rays. The shutter shaft 12 is then operatively secured to the forward projecting end of the power take off or shutter driving shaft S by means of clamping bracket 21 and the supporting bracket X as well as the axis of shaft 12 may be slightly tilted or adjusted by means of the micrometer adjustment screws 30 at the corners of the bracket in order that as near as possible a perfect axial alignment may be maintained between shafts S and 12. The special bearing B it will be noticed permits further slight variance of the position of the shaft 12, and is self-aligning.

In operation the cooperating blades of the several shutters pass across the lens in converging paths beginning at points spaced equi-distantly about the lens and the result is that the light is very quickly cut off from the periphery of the lens inwardly in a plurality of directions, the inclined edges and angles 22d of the several blades gradually cutting off the light but doing so rapidly in contrast to the abrupt transverse cut on lines radial to the lens as is the practice with conventional shutter mechanism widely utilized at this time.

The particular type of shutter elements or disks utilized, it will be noticed, will admit a maximum amount of light while completely covering the lens during the passage of the shutter blades thereover. The particular shape of the blades, including the angled sides 22d conform more closely to the shape of the lens and consequently obstruct less light in the passage thereover than the sector shaped blades utilized in most conventional shutters.

Due to the cooperation of the three shutter blades from points disposed circumferentially of the lens, the light is cut off and admitted much faster than with standard shutters now in use, and there will be no movement of the shutter blades across the lens during the time the film is in motion. This entirely obviates the so-called "travel ghost" as well as the objectionable flicker noticed in the exhibiting of most motion pictures.

The structure of my improved self-aligning bracket and supporting means for the gear and chain case effects a substantial improvement over the structure disclosed in the herein identified original Patent No. 1,749,154. The driven shutter shaft 12 will be rotated absolutely uniformly with my device and there is no objectionable noise effect produced in the synchronized talking mechanism associated with the motion picture film. Not only does the structure of the bracket and shutter shaft supports assure a perfect alignment of the power take off shaft, but the centers of the shutters are also precisely positioned for correct operation in respect to the center of the lens.

My improved mounting also enables a fine adjustment to be made in the tilting of the gear and chain case as well as providing a convenient means for spacing the shutters the proper distance from the lens by providing supporting shafts of the proper length to assure efficient operation.

It will, of course, be understood that various changes may be made in the form, details, proportions and arrangement of the parts, without departing from the scope of my invention, which, generally stated, consists in a device capable of carrying out the objects above set forth, and in the novel parts and combinations of parts disclosed and defined in the appended claims.

What is claimed is:—

1. Shutter mechanism for motion picture apparatus comprising a series of shutters arranged symmetrically about and equi-distant from the center of the lens of the apparatus, means for synchronously driving said shutters, each of said shutters comprising a disk having substantial and oppositely disposed cut-out portions to permit passage of light, said cut-out portions leaving rim portions surrounding the area of said lens, said shutters including a pair of diametrically disposed blades, said blades having their side edges diverging outwardly to a point which travels across the center of the lens, and then converging outwardly to the rim of the disk.

2. Shutter mechanism for motion picture apparatus comprising a series of shutters, the centers of which are arranged circumferentially about and equi-distantly from the center of the lens of the apparatus and also equi-distantly apart, means for synchronously driving said shutters, each of said shutters comprising a disk cut out to form a central hub portion and substantial portions at opposite sides of said hub portion permitting passage of light, said portions leaving rim portions which surround the area of the lens, said shutters also each including a pair of radially extending blades extending from said hub portions to said rim portions, said blades having their side edges diverging outwardly to a point which travels across the center of the lens and then converging outwardly to the rim of the disk.

3. In combination with a motion picture projector having the usual lens and the usual shutter driving shaft positioned at a predetermined distance from the center of said lens, shutter mechanism comprising a mounting, a series of rotary shutters carried by said mounting with their edges overlapping and with their centers arranged in the corners of an equilateral triangle, said mounting having a guide or eye aligned with the axis of one of said shutters and adapted to be engaged with the shutter driving shaft of said projector to correctly position said mounting with respect to said driving shaft and means on said mounting for snugly surrounding a portion of said projector to arrange the centers of said shutters circumferentially of said lens with said shutter driving shaft properly aligned.

4. In combination with a motion picture projector having the usual lens and conventional lens collar surrounding said lens and secured to the front wall of the projector case and also having the usual shutter driving shaft positioned at a predetermined distance from the center of the lens, shutter mechanism comprising a mounting having an inner arcuate edge adapted to snugly embrace the periphery of the lens receiving collar and having a bearing eye disposed a predetermined distance from said arcuate edge, a series of rotary shutters carried by said mounting and arranged equi-distantly with respect to each other and also with respect to the radial center of said arcuate edge, means in said mounting for synchronously connecting said shutters for driving, one of said shutters having a driving shaft axially aligned with the bearing eye of said mounting.

5. In combination with a motion picture projector having the usual lens and shutter driving shaft positioned at a predetermined distance from the center of said lens, shutter machanism comprising a supporting bracket adapted to be positioned in a predetermined relationship with reference to said lens and shutter driving shaft, a series of forwardly and substantially horizontally extending supporting elements attached at their inner ends to said supporting bracket, a chain case detachably connected with the outer ends of said supporting elements and having adjustable attachment means for engaging said outer ends to position said chain case in a predetermined relationship with respect to the lens, a series of shutter shafts revolubly mounted in said case at the corners of an equilateral polygon which symmetrically surrounds said lens and a chain mounted in said case for driving said shafts synchronously.

6. In combination with a motion picture projector having the usual lens and shutter driving shaft positioned at a predetermined distance from the center of the lens, a supporting bracket having an arcuate edge adapted to snugly surround a portion of the front of the projector to position said bracket concentrically with said lens, a guide or eye carried by said bracket and adapted to be precisely aligned with the outer end of said shutter driving shaft at the same time said edge engages said aligning portion, a frame or casing detachably carried by said supporting bracket, a series of shutter shafts journaled in said casing, one of said shafts being precisely aligned with the eye in said supporting bracket and a coupling member for substantially rigidly securing the rear end of said last mentioned shutter shaft to the forward end of said shutter driving shaft.

7. In combination with a motion picture projector having the usual casing, lens and shutter driving shaft, a supporting bracket in the form of a plate, means for securing said bracket to the front wall of said projector casing, a frame or case detachably carried by said supporting bracket, a series of shutter shafts journaled in said casing and arranged circumferentially about said lens, over-lapping shutters attached to the outer ends of said shafts, one of said shafts being connected for driving with said shutter driving shaft, said supporting bracket having a micrometer adjustment for determining the angulation thereof with the front surface of said projector casing, said adjustment comprising a plurality of widely spaced thrust screws threadedly mounted in said supporting bracket and adapted to engage the front wall of said projector casing.

8. In combination with a motion picture projector having the usual lens, the usual shutter drive shaft positioned at a predetermined distance from the center of said lens and the usual lens collar concentrically surrounding said lens; shutter mechanism comprising a mounting, a series of rotary shutters carried by said mounting with their edges overlapping and with their centers arranged in the corners of an equi-lateral triangle, said mounting having an arcuate alignment flange adapted to snugly surround a portion of said lens collar to perfectly align said mounting concentrically of said lens, said mounting having a guide or eye aligned with the axis of one of said shuters and adapted to surround the shutter drive shaft of the projector for correctly positioning said mounting angularly of the axis of said lens.

ISRAEL DIEBEL.